(12) United States Patent
Shinzo et al.

(10) Patent No.: US 6,894,090 B2
(45) Date of Patent: May 17, 2005

(54) METHOD FOR PRODUCING AQUEOUS DISPERSION OF THERMOPLASTIC RESIN MICROPARTICLES AND TONER FOR ELECTROPHOTOGRAPHY

(75) Inventors: Kinji Shinzo, Sakura (JP); Hiroyuki Terada, Funabashi (JP); Hideki Watanabe, Yotsukaido (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/307,469

(22) Filed: Dec. 2, 2002

(65) Prior Publication Data

US 2003/0124448 A1 Jul. 3, 2003

(30) Foreign Application Priority Data

Dec. 3, 2001 (JP) ........................................ 2001-368585

(51) Int. Cl.[7] .............................. C08J 3/00; C08K 7/16
(52) U.S. Cl. ........................................ 523/223; 523/332
(58) Field of Search ................................ 523/223, 332

(56) References Cited

U.S. PATENT DOCUMENTS

| | | |
|---|---|---|
| 4,340,519 A | 7/1982 | Kotera et al. |
| 5,484,842 A | 1/1996 | Lewarchik et al. |
| 5,691,095 A | 11/1997 | Shinzo et al. |
| 5,843,614 A | 12/1998 | Shinzo et al. |
| 6,203,957 B1 | 3/2001 | Nomura et al. |
| 6,248,491 B1 * | 6/2001 | Takayanagi et al. ........ 430/124 |

FOREIGN PATENT DOCUMENTS

| | | |
|---|---|---|
| EP | 0 671 430 A1 | 9/1995 |
| EP | 0797122 A1 | 9/1997 |
| EP | 1 087 265 A1 | 3/2001 |
| JP | 56-88454 | 7/1981 |
| JP | 56-125432 | 10/1981 |
| JP | 3-221137 | 9/1991 |
| JP | 5-66600 | 3/1993 |
| JP | 8-211655 | 8/1996 |
| JP | 9-297431 | 11/1997 |
| JP | 9-311502 | 12/1997 |

* cited by examiner

*Primary Examiner*—Patrick D. Niland
(74) *Attorney, Agent, or Firm*—Armstrong, Kratz, Quintos, Hanson & Brooks, LLP

(57) ABSTRACT

The present invention provides a method for producing an aqueous dispersion of thermoplastic resin microparticles containing considerably less residual solvent remaining in resin particles, and a toner for electrophotography containing considerably less residual solvent. A self-water-dispersible thermoplastic resin is swollen using an organic solvent having a boiling point lower than 100° C., which does not dissolve but can swell the self-water-dispersible thermoplastic resin, to produce a swollen material and the resulting swollen material is dispersed into an aqueous medium in the form of microparticles to produce an initial aqueous dispersion, and then the organic solvent is removed from the initial aqueous dispersion to prepare a dispersion. A toner for electrophotography contains microparticles obtained by separating microparticles of the self-water-dispersible thermoplastic resin from the aqueous dispersion of thermoplastic resin microparticles and drying the microparticles.

18 Claims, No Drawings

METHOD FOR PRODUCING AQUEOUS DISPERSION OF THERMOPLASTIC RESIN MICROPARTICLES AND TONER FOR ELECTROPHOTOGRAPHY

BACKGROUND OF THE INVENTION

1. Field of the Invention

The present invention relates to a method for producing an aqueous dispersion of thermoplastic resin microparticles used in printing materials such as toner for electrophotography and ink, coating compositions, adhesives, and adhesive materials, and in textile processing, paper making/paper processing, and civil engineering, and relates to an toner for electrophotography containing thermoplastic resin microparticles obtained by the method.

2. Description of Related Art

Methods of producing aqueous dispersions of thermoplastic resin microparticles are roughly classified into polymerization granulation methods of forming emulsion particles from a polymerized monomer in a polymerization process and dispersion granulation methods of forming a resin into microparticles.

With respect to the former polymerization granulation methods, although seed polymerization methods and dispersion polymerization methods have been developed based on an emulsion polymerization technique and a suspension polymerization technique, other components such as emulsifiers and suspension stabilizers are required to stably disperse a monomer into an aqueous phase according to the objective particle diameter and it is difficult to remove them. Also, as a matter of course, this granulation method can be applied only in the production of a vinyl resin emulsion.

On the other hand, the latter dispersion granulation methods are widely applied, and for example, can be applied not only to a vinyl resin, but also to a polyaddition resin, a polycondensation resin and a natural resin, and thus manufacturing methods such as spray drying methods and coacervation methods are developed.

Phase inversion emulsification methods are one type of these dispersion granulation methods and there are known methods for producing microcapsules, comprising mixing an organic phase, which is obtained by dispersing or dissolving a hydrophobic substance into a self-water-dispersible resin dissolved in an organic solvent, with water, thereby causing phase inversion emulsification, and removing the organic solvent (see Japanese Unexamined Patent Application, First Publication, No. Hei 03-221137 (claims and pages 3 to 6); methods for producing encapsulated toners, comprising dispersing a colorant in an organic solvent solution of an anionic self-water-dispersible resin, thereby neutralizing the resin, and performing phase inversion emulsification of the resin into an aqueous medium, followed by removal of the organic solvent and further drying (see Japanese Unexamined Patent Application, First Publication, No. Hei 05-066600 (claims and pages 6 to 7)); methods for producing toners, comprising using a polyester resin having a neutralized salt structure as the anionic self-water-dispersible resin (see Japanese Unexamined Patent Application, First Publication, No. Hei 08-211655 (claims and pages 4 to 6)); and methods for producing toners for electrophotography, comprising emulsifying an organic solvent solution containing a colorant and a self-water-dispersible resin and an aqueous medium using a continuous emulsifying dispersing machine, followed by removal of the organic solvent and further drying (see Japanese Unexamined Patent Application, First Publication, No. Hei 09-297431 (claims and pages 3 to 6)). According to these methods, since the self-water-dispersible thermoplastic resin is used, an aqueous dispersion of thermoplastic resin microparticles can be produced without using auxiliary materials such as emulsifiers and suspension stabilizers.

As described above, although phase inversion emulsification methods are useful, and can be applied to thermoplastic resins, these methods were developed taking into account the preparation of the organic solvent solution of the self-water-dispersible thermoplastic resin. Therefore, only research about a combination of the self-water-dispersible thermoplastic resin and the organic solvent capable of dissolving the thermoplastic resin (good solvent) was proposed. Thus, these methods were not applied to the combination of a self-water-dispersible thermoplastic resin and the organic solvent in which it is difficult to dissolve the thermoplastic resin (poor solvent).

The phase inversion emulsification method had a drawback in that because of the combination of the self-water-dispersible thermoplastic resin and the organic solvent capable of dissolving the thermoplastic resin (good solvent), the affinity between the self-water-dispersible thermoplastic resin and the organic solvent is high even after the self-water-dispersible thermoplastic resin was dispersed into the aqueous medium and, as a result, a high concentration of the residual solvent remains in resin particles even after removal of the organic solvent.

Furthermore, aqueous dispersions obtained by mixing a neutralized acid group-containing polyester resin, a water-soluble organic compound having a boiling point of 60 to 200° C. and water at a specific ratio are known (see Japanese Unexamined Patent Application, First Publication, No. Sho 56-088454 (pages 2, 4, and 7; corresponding to U.S. Pat. No. 4,340,519); and Japanese Unexamined Patent Application, First Publication, No. Sho 56-125432 (pages 2, 4, and 7)).

As the water-soluble organic compound having a boiling point of 60 to 200° C., these patent documents disclose an organic solvent having a boiling point equal to or higher than 100° C., which dissolves the polyester resin, and an organic solvent having a boiling point lower than 100° C., which does not dissolve the polyester resin, but none discloses or teaches anything about removal of the organic solvent from the resulting aqueous dispersion and the use of the polyester resin in combination with the organic solvent which does not dissolve the polyester resin. In the Examples, after producing an aqueous dispersion by using an organic solvent having a boiling point equal to or higher than 100° C., which dissolves the polyester resin (good solvent), the resulting aqueous dispersion is used for a coating. Even if the organic solvent is removed from the aqueous dispersion obtained in the Examples, a high concentration of the organic solvent remains in the resin particles.

BRIEF SUMMARY OF THE INVENTION

An object of the present invention is to provide a method for producing an aqueous dispersion of thermoplastic resin microparticles containing considerably less residual solvent remaining in resin particles, and a toner for electrophotography containing considerably less residual solvent.

To achieve the object described above, the present inventors have intensively researched and discovered the following points (a) to (d), and thus completed the present invention.

(a) A swollen material, which is obtained by absorbing an organic solvent (S) having a boiling point lower than 100° C., which does not dissolve but can swell a self-water-dispersible thermoplastic resin (P), into the self-water-dispersible thermoplastic resin (P), is easily dispersed in an aqueous medium in the form of microparticles by means of phase inversion emulsification to prepare an aqueous dispersion of thermoplastic resin microparticles.

(b) Since the organic solvent (S) having a boiling point lower than 100° C., which does not dissolve the self-water-dispersible thermoplastic resin (P), is used as the organic solvent, the organic solvent in the resulting aqueous dispersion is easily removed, and thus it is possible to produce an aqueous dispersion of thermoplastic resin microparticles, which contains considerably less residual organic solvent.

(c) In the method for producing the aqueous dispersion of thermoplastic resin microparticles, by using the self-water-dispersible thermoplastic resin (P) in combination with colorants (C), it is made possible to prepare a dispersion in which microparticles of the self-water-dispersible thermoplastic resin (P) colored with the colorant (C) are dispersed in the aqueous medium.

(d) A toner for electrophotography containing considerably less residual organic solvent can be prepared by separating microparticles in the aqueous dispersion of thermoplastic resin microparticles obtained by the method for producing the aqueous dispersion of thermoplastic resin microparticles and drying the microparticles.

The present invention provides a method for producing an aqueous dispersion of thermoplastic resin microparticles, which comprises the first step of swelling a self-water-dispersible thermoplastic resin (P) using an organic solvent (S) having a boiling point lower than 100° C., which does not dissolve but can swell the self-water-dispersible thermoplastic resin (P), to produce a swollen material; the second step of dispersing the swollen material into an aqueous medium in the form of microparticles to produce an initial aqueous dispersion; and the third step of removing the organic solvent (S) from the initial aqueous dispersion to produce a dispersion in which microparticles of the self-water-dispersible thermoplastic resin (P) are dispersed into the aqueous medium.

Also, the present invention provides a toner for electrophotography comprising microparticles obtained by separating microparticles of a self-water-dispersible thermoplastic resin (P) from the aqueous dispersion of thermoplastic resin microparticles obtained by the above production method and drying the microparticles.

According to the production method of the present invention, an organic solvent (S) having a boiling point lower than 100° C., which does not dissolve but can swell a self-water-dispersible thermoplastic resin (P), is absorbed into the self-water-dispersible thermoplastic resin (P) to prepare a swollen material, and the swollen material is dispersed in an aqueous medium in the form of microparticles by means of phase inversion emulsification, and then the organic solvent is removed from the resulting dispersion. Therefore, the organic solvent can be easily removed, and thus it is possible to prepare an aqueous dispersion of thermoplastic resin microparticles, which contains considerably less residual solvent.

Also, there is an advantage in that the toner for electrophotography comprising microparticles, which is obtained by separating resin particles from the aqueous dispersion of thermoplastic resin microparticles obtained by the above production method of the present invention and drying the resin particles, contains considerably less residual solvent.

DETAILED DESCRIPTION OF THE INVENTION

The present invention will now be described in detail.

The thermoplastic resin (P) is a thermoplastic resin which can be dispersed in an aqueous medium without using emulsifiers or suspension stabilizers, or a thermoplastic resin which is made dispersible in the aqueous medium by means of neutralization, and may be any of a vinyl resin, a polyaddition resin, a polycondensation resin and a natural resin. Among these thermoplastic resins, preferred is a thermoplastic resin which can be dispersed in the form of particles having an average particle diameter of 10 $\mu$m or less as a result of phase inversion emulsification by adding dropwise an aqueous medium (aqueous medium containing a neutralizer in the case of a thermoplastic resin which can be made dispersible in the aqueous medium by means of neutralization) in a resin solution obtained by dissolving the thermoplastic resin (P) in an organic solvent such as tetrahydrofuran or methyl ethyl ketone capable of dissolving the thermoplastic resin (P) at normal temperature while stirring, and particularly preferred is a thermoplastic resin which can be dispersed in the form of particles having an average particle diameter of 0.1 $\mu$m or less.

Examples of the self-water-dispersible thermoplastic resin include neutralized acid group-containing thermoplastic resin, such as sulfonic acid metal salt or carboxylic acid metal salt; neutralized basic group-containing thermoplastic resin; hydrophilic segment-containing thermoplastic resin, for example, thermoplastic resin into which a nonion structure is introduced, such as hydroxypolyoxyethylene; thermoplastic resin having an acid group such as carboxyl group, which can be anionically modified in an aqueous phase by adding neutrailizers, for example, organic base such as alkanolamine, and inorganic base such as ammonia or sodium hydroxide; and thermoplastic resin having a basic group such as an amino group or pyridine ring, which can be cationically modified by adding neutralizers such as organic acid and inorganic acid. Among these thermoplastic resins, a neutralized acid group-containing thermoplastic resin and an acid group-containing thermoplastic resin are preferred and an acid group-containing thermoplastic resin is particularly preferred because it has low hygroscopicity and can be easily stored.

Examples of the neutralized acid group-containing thermoplastic resin include neutralized acid group-containing polyester resin, neutralized acid group-containing polyurethane resin, neutralized acid group-containing (meth)acrylic resin, neutralized acid group-containing styrene resin, neutralized acid group-containing styrene-(meth)acrylate ester copolymer resin, neutralized acid group-containing rosin resin and neutralized acid group-containing petroleum resin. Among these thermoplastic resins, a neutralized acid group-containing polyester resin (PE) and a neutralized acid group-containing styrene-(meth)acrylate ester copolymer resin are preferred because a toner for electrophotography having excellent fixing properties and high image quality can be obtained when using resin microparticles obtained by the production method of the present invention as a binder of the toner for electrophotography, and a neutralized acid group-containing polyester resin (PE) is particularly preferred. In the case in which neutralization is eliminated from the neutralized acid group-containing polyester resin (PE), the acid value is preferably within a range from 1 to 100, and more preferably from 5 to 40.

Examples of the neutralized acid group-containing polyester resin (PE) include polyester resin (PE1) obtained by using a compound having a neutralized acid group as an essential component, and polyester resin (PE2) obtained by preparing a polyester resin having an acid group such as a carboxyl group, which can be converted into a self-water-dispersible thermoplastic resin (P) by means of neutralization, and neutralizing the acid group. Specific examples thereof include neutralized carboxyl group-containing polyester resin, neutralized sulfonic group-containing polyester resin and neutralized phosphoric acid group-containing polyester resin. A neutralized sulfonic group-containing polyester resin is preferred as the polyester resin (PE1), while a neutralized carboxyl group-containing polyester resin is preferred as the polyester resin (PE2).

The neutralized acid group-containing polyester resin (PE1) can be prepared, for example, by the method of dehydration condensation at a reaction temperature from 180 to 260° C. while measuring the acid value using dibasic acid or an anhydride thereof, a dihydric alcohol and a dibasic acid having a neutralized acid group, as an essential component, in combination with a tri- or polyfunctional polybasic acid or an anhydride thereof, a monobasic acid, a tri- or polyfunctional alcohol, or monohydric alcohol, as an optional component.

Examples of the above-described acid group-containing thermoplastic resin include acid group-containing polyester resin, acid group-containing polyurethane resin, acid group-containing (meth)acrylic resin, acid group-containing styrene resin, acid group-containing styrene-(meth)acrylate ester copolymer resin, acid group-containing rosin resin and acid group-containing petroleum resin. Among these thermoplastic resins, an acid group-containing polyester resin (pe) and an acid group-containing styrene-(meth)acrylate ester copolymer resin are preferred because a toner for electrophotography having excellent fixing properties and superior image quality can be obtained when using resin microparticles obtained by the method of the present invention as a binder of the toner for electrophotography, and an acid group-containing polyester resin (pe) is particularly preferred. The acid value of the acid group-containing polyester resin (pe) is preferably within a range from 1 to 100, and more preferably from 5 to 40.

As the acid group-containing polyester resin (pe), for example, a polyester resin (pe1) obtained by using a compound having an acid group such as a carboxyl group as an essential component is preferred. Specific examples of the polyester resin (pe1) include carboxyl group-containing polyester resin, sulfonic acid group-containing polyester resin and phosphoric acid group-containing polyester resin. Among these polyester resins, a carboxyl group-containing polyester resin is preferred.

The carboxyl group-containing polyester resin can be prepared, for example, by a method of dehydration condensation at a reaction temperature from 180 to 260° C. while measuring the acid value using dibasic acid or an anhydride thereof and a dihydric alcohol, as an essential component, in combination with a tri- or polyfunctional polybasic acid or an anhydrides thereof, a monobasic acid, a tri- or polyfunctional alcohol, or monohydric alcohol, as an optional component in such a composition ratio that a carboxyl group remains.

As the apparatus used in the preparation of these polyester resins (PE) and (pe), not only a batchwise manufacturing apparatus such as reaction vessel equipped with a nitrogen introducing inlet, a thermometer, a stirrer and a rectifier can be preferably used, but also an extruder equipped with a deaeration port, a continuous reactor and a kneader can be used. In the case of the dehydration condensation, the esterification reaction can be promoted by optionally evacuating the reaction system. Furthermore, various catalysts can be added to promote the esterification reaction.

Examples of the catalyst include antimony oxide, barium oxide, zinc acetate, manganese acetate, cobalt acetate, zinc succinate, zinc borate, cadmium formate, lead monooxide, calcium silicate, dibutyltin oxide, butylhydroxytin oxide, tetraisopropyl titanate, tetrabutyl titanate, magnesium methoxide and sodium methoxide.

Examples of the dibasic acid having a neutralized acid group include metal salts such as sodium salt, potassium salt, calcium salt, barium salt and zinc salt of sulfoterephthalic acid, 3-sulfoisophthalic acid, 4-sulfophthalic acid, 4-sulfonaphthalene-2,7-dicarboxylic acid, sulfo-p-xylylene glycol and 2-sulfo-1,4-bis(hydroxyethoxy)benzene.

Examples of the dibasic acid and anhydrides thereof include aliphatic dibasic acid such as maleic acid, maleic anhydride, fumaric acid, itaconic acid, itaconic anhydride, oxalic acid, malonic acid, succinic acid, succinic acid anhydride, dodecylsuccinic acid, dodecylsuccinic acid anhydride, dodecenylsuccinic acid, dodecenylsuccinic acid anhydride, adipic acid, azelaic acid, sebacic acid or decane-1,10-dicarboxylic acid; and aromatic or alicyclic dibasic acid, such as phthalic acid, tetrahydrophthalic acid and an anhydride thereof, hexahydrophthalic acid and an anhydride thereof, tetrabromophthalic acid and an anhydride thereof, tetrachlorophthalic acid and an anhydride thereof, Het acid and an anhydride thereof, himic acid and an anhydride thereof, isophthalic acid, terephthalic acid, cyclohexanedicarboxylic acid or 2,6-naphthalenedicarboxylic acid.

Examples of the dihydric alcohol include aliphatic diols such as ethylene glycol, 1,2-propylene glycol, 1,4-butanediol, 1,5-pentanediol, 1,6-hexanediol, diethylene glycol, dipropylene glycol, triethylene glycol and neopentyl glycol; bisphenols such as bisphenol A and bisphenol F; bisphenol A alkylene oxide adducts such as ethylene oxide adduct of bisphenol A and propylene oxide adduct of bisphenol A; aralkylene glycols such as xylylene diglycol; and alicyclic diols such as 1,4-cyclohexanedimethanol and hydrogenated bisphenol A.

Examples of the tri- or polyfunctional polybasic acid and anhydride thereof include trimellitic acid, trimellitic acid anhydride, methylcyclohexenetricarboxylic acid, methylcyclohexenetricarboxylic acid anhydride, pyromellitic acid and pyromellitic acid anhydride.

Examples of the monobasic acid include benzoic acid and p-tert-butylbenzoic acid.

Examples of the tri- or polyfunctional alcohol include glycerin, trimethylolethane, trimethylolpropane, sorbitol, 1,2,3,6-hexanetetrol, 1,4-sorbitan, pentaerythritol, dipentaerythritol, 2-methylpropanetriol, 1,3,5-trihydroxybenzene and tris(2-hydroxyethyl) isocyanurate.

Examples of the monohydric alcohol include higher alcohol such as stearyl alcohol.

The above-described dibasic acid and anhydride thereof, tri- or polyfunctional basic acid and anhydride thereof, and monobasic acid may be used alone, or two or more kinds thereof may be used in combination. Also, those wherein a portion or all of carboxyl groups are replaced by an alkyl ester, an alkenyl ester, or an aryl ester can be used.

The above-described dihydric alcohol, tri- or polyfunctional alcohol and monohydric alcohol can be used alone, or two or more kinds thereof can be used in combination.

A compound having both a hydroxyl group and a carboxyl group in a molecule or a reactive derivative thereof, for example, dimethylolpropionic acid, dimethylolbutanoic acid and 6-hydroxyhexanonic acid can be used.

As the carboxyl group-containing polyester resin, for example, there can be preferably used a polyester resin obtained by mixing a polyester resin (I) having a gel fraction of 0.3% by weight or less, a weight-average molecular weight (Mw) as measured by a GPC (gel permeation chromatography) method of 3,000 to 20,000, a number-average molecular weight (Mn) of 1,000 to 5,000, a ratio (Mw/Mn) of 2 to 10, a ½ descendent temperature ($T_{1/2}$) as measured by a flow tester of 80 to 140° C. and an acid value of 1 to 100 with polyester resin (II) having a gel fraction of 2% by weight or less, a weight-average molecular weight (Mw) as measured by a GPC method of 200,000 to 2,000,000, a number-average molecular weight (Mn) of 5,000 to 20,000, a ratio (Mw/Mn) of 10 to 400, a ½ descendent temperature ($T_{1/2}$) as measured by a flow tester of 150 to 250° C. and an acid value of 1 to 100 because a toner for electrophotography having a high upper temperature limit in a non-offset region and good fixing properties at low temperature can be obtained.

The polyester resin (I) is more preferably a polyester resin having a weight-average molecular weight (Mw) of 4,000 to 10,000, a number-average molecular weight (Mn) of 2,000 to 4,000, and a ratio (Mw/Mn) of 2 to 5 and a ½ descendent temperature ($T_{1/2}$) as measured by a flow tester of 80 to 120° C.

The polyester resin (II) is more preferably a polyester resin having a gel fraction of 0.2 to 0.7% by weight, a weight-average molecular weight (Mw) of 200,000 to 1,000,000, a number-average molecular weight (Mn) of 5,000 to 10,000, a ratio Mw/Mn of 20 to 200 and a ½ descendent temperature ($T_{1/2}$) as measured by a flow tester of 160 to 230° C.

Among the polyester resin (II), a polyester resin obtained by reacting a divalent basic acid, a dihydric alcohol and a difunctional epoxy compound is preferred because a toner for electrophotography having a wide fixing temperature range can be obtained, and a polyester obtained by using a raw material component containing 0.5 to 2.5% by weight of a difunctional epoxy compound is more preferred.

Examples of the difunctional epoxy compound include bisphenol A epoxy resin, bisphenol F epoxy resin, ethylene glycol diglycidyl ether, hydroquinone diglycidyl ether and neopentyl glycol diglycidyl ether. Among these epoxy compounds, a bisphenol A epoxy resin and a bisphenol F epoxy resin are preferred. These epoxy compounds may be used alone or in combination.

The polyester resin (II) is particularly preferably a polyester resin obtained by using a raw material component containing 1 to 10% by weight of a monoepoxy compound having a $C_{4-28}$ alkyl group, in addition to a divalent basic acid, a dihydric alcohol and a difunctional epoxy compound. The monoepoxy compound having a $C_{4-28}$ alkyl group is preferably a glycidyl ester of carboxylic acid, and a neodecanoic acid glycidyl ester is particularly preferred.

In the present invention, the gel fraction is a weight percentage of an insoluble matter when a polyester resin (I) and a polyester resin (II) are dissolved in tetrahydrofuran at 25° C. for 24 hours. The measurement is performed in the following procedure. That is, after charging 250 ml of tetrahydrofuran in a 300 ml glass vessel, a 500 mesh wire gauze bag (3×5 cm) containing 1.5 g of a finely ground polyester resin is put in the vessel and dissolved at room temperature for 24 hours. Then, the proportion of the insoluble matter is determined.

The weight-average molecular weight (Mw) and the number-average molecular weight (Mn) of the polyester resin in the present invention are values obtained by measuring the component capable of dissolving in tetrahydrofuran under the following conditions using a GPC method.
GPC apparatus: HLC-8120GPC manufactured by TOSO Co., Ltd.
Column: TSK-GEL G-5000HXL, G-4000HXL, G-3000HXL and G-2000HXL manufactured by TOSO Co., Ltd.
Solvent: tetrahydrofuran
Concentration of solvent: 0.5% by weight
Flow rate: 1.0 ml/min The ½ descendent temperature ($T_{1/2}$) as measured by a flow tester in the present invention refers to a temperature corresponding to a height of h/2, provided that h denotes a height of a S shaped curve in a (descent of plunger of flow tester)-temperature curve (softening flow curve) obtained when the measurement was conducted under the conditions that a load of 10 kg/cm$^2$, a nozzle diameter of 1 mm, a nozzle length of 1 mm, a preheating temperature of 70° C., a preheating time of 5 minutes, a preheating rate of 6° C./min. and a sample weight of 1.5 g using a Koka-type flow tester Model "CFT-500" manufactured by Shimadzu Corporation.

The weight ratio of the polyester resin (I) to the polyester resin (II), (i.e., (I)/(II)), is preferably within a range from 30/70 to 70/30 because a toner for electrophotography having excellent fixing properties, excellent anti-offset properties (properties for preventing fusion of the toner onto a fixing roll) and excellent storage stability can be obtained.

The polyester resin obtained by mixing the polyester resin (I) with the polyester resin (II) can be preferably used as a raw material of a toner for electrophotography by means of a grinding method because a toner for electrophotography having a high upper temperature limit in a non-offset region and good fixing properties at low temperature can be obtained. When using as the raw material of the toner for electrophotography by means of the grinding method, neither the polyester resin (I) nor the polyester resin (II) may have an acid group such as carboxyl group required to prepare an aqueous dispersion.

Furthermore, the carboxyl group-containing polyester resin is more preferably a polyester resin having an alkyl group and/or an alkenyl group because microparticles of the self-water-dispersible thermoplastic resin (P) can exist more stably in the aqueous medium. Among these polyester resins, a polyester resin having a terminal structure prepared by ring-opening addition of an acid anhydride having a $C_{4-20}$ alkyl group or a $C_{4-20}$ alkenyl group to a terminal hydroxyl group of a polyester resin having a terminal hydroxyl group and a polyester resin having a terminal structure prepared by ring-opening addition of an aliphatic monoepoxy compound having a $C_{4-20}$ alkyl group or a $C_{4-20}$ alkenyl group to a terminal carboxyl group of a polyester resin having a terminal carboxyl group are particularly preferred.

Examples of the acid anhydride having a $C_{4-20}$ alkyl group or a $C_{4-20}$ alkenyl group include n-octyl succinic anhydride, isooctyl succinic anhydride, n-dodecenylsuccinic anhydride and isododecenylsuccinic anhydride. Among these acid anhydrides, isododecylsuccinic anhydride and dodecenylsuccinic anhydride are preferred.

Examples of the aliphatic monoepoxy compound having a $C_{4-20}$ alkyl group or a $C_{4-20}$ alkenyl group include Cardula E10 as a glycidyl ester of branched fatty acid manufactured by Shell Chemical Co.; monoglycidyl ester of fatty acid, such as castor oil fatty acid, coconut oil fatty acid, soybean oil fatty acid or tung oil fatty acid; and monoglycidyl ester of branched fatty acid, such as isononanoic acid.

The organic solvent (S) used in the present invention may be an organic solvent having a boiling point (hereinafter referred to as a boiling point at normal pressure (101.3 KPa)) of lower than 100° C., which does not dissolve but can swell the self-water-dispersible thermoplastic resin (P). When using an organic solvent which dissolves the self-water-dispersible thermoplastic resin (P) and/or an organic solvent having a boiling point higher than 100° C., it becomes difficult to remove the organic solvent in the third step. Also, when using an organic solvent which cannot swell the self-water-dispersible thermoplastic resin (P), it becomes difficult to disperse the self-water-dispersible thermoplastic resin (P) into the aqueous medium in the second step. Therefore, both cases are not preferred.

The organic solvent (S), which does not dissolve the self-water-dispersible thermoplastic resin (P), used in the present invention does not mean an organic solvent wherein the solubility of the self-water-dispersible thermoplastic resin (P) in the organic solvent is 0% by weight, but means an organic solvent wherein the solubility of the self-water-dispersible thermoplastic resin (P) in the organic solvent is 15% by weight or less at 25° C. when using the organic solvent in combination with the self-water-dispersible thermoplastic resin (P).

In the present invention, it can be determined according to criteria described in 7.2.1.1 to 7.2.1.3 of 7.2 (Interpretation of Results) of ASTM D3132-84 (Reapproved 1996) whether or not the organic solvent corresponds to the organic solvent (S) which does not dissolve the self-water-dispersible thermoplastic resin (P).

It is possible to determine whether or not the organic solvent corresponds to the organic solvent (S) in the following procedure. That is, 15 parts of the self-water-dispersible thermoplastic resin (P) in the form of particles and 85 parts by weight of the organic solvent are charged in a flask and, after sealing and shaking the flask at 25° C. for 16 hours, the dissolved state is observed and evaluated according to the following criteria described in 7.2.1.1 to 7.2.1.3 of ASTM D3132-84, for example, 1. "Complete Solution", 2. "Borderline Solution" and 3. "Insoluble".
1. "Complete Solution"; A single, clear liquid phase with no distinct solid or gel particle.
2. "Borderline Solution"; Cloudy or turbid but without distinct phase separation.
3. "Insoluble"; Two phases: either a liquid with separate gel solid phase or two separate liquids.

In the present invention, as the self-water-dispersible thermoplastic resin (P) in the form of particles, coarse ground particles of the self-water-dispersible thermoplastic resin (P) obtained by passing through a screen having a pore diameter of 3 mm were used for evaluation.

The production method of the present invention is a method of using the self-water-dispersible thermoplastic resin (P) and the organic solvent (S) in the combination that enables 2. "Borderline Solution" or 3. "Insoluble" in the evaluation whether or not the organic solvent corresponds to the organic solvent (S). By using the self-water-dispersible thermoplastic resin (P) and the organic solvent (S) in this combination, desolvation can be easily conducted in the third step.

The organic solvent (S) used in the present invention is preferably an organic solvent wherein the solubility of the self-water-dispersible thermoplastic resin (P) in the organic solvent is 10% by weight or less at 25° C., because desolvation can be conducted more easily in the third step, and is more preferably an organic solvent wherein the solubility is 7% by weight or less. The solubility can be evaluated by evaluation at the resin concentration of 10% by weight or 7% by weight in place of evaluating whether or not the organic solvent corresponds to the organic solvent (S) at the resin concentration of 15% by weight.

Furthermore, the organic solvent (S) is preferably an organic solvent (S1) compatible with water because it is possible to efficiently produce resin particles, which can be easily removed from the swollen material in the form of particles dispersed in the aqueous medium and contain considerably less residual solvent, in a simple and economical manner. It is not necessary that water and the organic solvent form a uniform phase at all mixing ratios, and the organic solvent (S1) may be compatible with water at the temperature and the composition range of water and the organic solvent in the case of dispersing the swollen material, which is obtained by swelling the self-water-dispersible thermoplastic resin (P) using the organic solvent (S), into the aqueous medium. The organic solvent (S1) may be either a single organic solvent or a mixed solvent as long as it can satisfy these conditions, but is preferably compatible with water at the temperature at which the organic solvent (S1) is removed in the third step, and more preferably compatible with water at 25° C. The organic solvent (S1) preferably has solubility in water of 50% by weight or more at 25° C., and is particularly preferably compatible with water at 25° C. at any ratio. In the case in which the organic solvent (S1) is a mixed solvent, the boiling point of any organic solvent used is preferably lower than 100° C. The boiling point of the organic solvent (S1) is preferably within a range from 40 to 90° C., more preferably from 40 to 85° C., and most preferably from 40 to 60° C.

Examples of the organic solvent (S1) include ketones such as acetone (solubility: compatible with water at any ratio, boiling point: 56.1° C.); alcohols such as methanol (solubility: compatible with water at any ratio, boiling point: 64.7° C.), ethanol (solubility: compatible with water at any ratio, boiling point: 78.3° C.) and isopropyl alcohol (solubility: compatible with water at any ratio, boiling point: 82.26° C.); and esters such as methyl acetate (solubility: 24% by weight, boiling point: 56.9° C.). These organic solvents (S1) may be used alone, or a mixed solvent of two or more kinds thereof may be used. The organic solvent (S1) is preferably ketones or alcohols, more preferably acetone or isopropyl alcohol, and most preferably acetone.

The amount of the organic solvent (S) varies depending on the particle diameter of resin microparticles in the objective aqueous dispersion of thermoplastic resin microparticles, but is preferably within a range from 5 to 300 parts by weight, more preferably from 10 to 200 parts by weight, and most preferably from 20 to 150 parts by weight, based on 100 parts by weight of the self-water-dispersible thermoplastic resin (P) because the self-water-dispersible thermoplastic resin (P) is swollen by sufficiently absorbing the organic solvent (S) to give a pasty swollen material which can be dispersed in the form of microparticles in the first step, and also, the swollen material is easily dispersed into the aqueous medium and the amount of the aqueous medium used to complete the dispersion can be controlled in the second step, and thus and the content of the organic solvent in the aqueous dispersion of thermoplastic resin microparticles does not increase, resulting in good manufacturing efficiency.

The amount of water is preferably within a range from 70 to 400 parts by weight, and more preferably from 100 to 250 parts by weight, based on 100 parts by weight of the total of the self-water-dispersible thermoplastic resin (P) and the organic solvent (S).

When using a thermoplastic resin, which can be dispersed in the aqueous medium, as the self-water-dispersible thermoplastic resin (P) without using emulsifiers or suspension stabilizers, water is preferred used as the aqueous medium in he present invention. When using a thermoplastic resin, which is made dispersible in the aqueous medium by means of neutralization, as the self-water-dispersible thermoplastic resin (P) without using emulsifiers or suspension stabilizers, water containing a neutralizer is preferably used. If necessary, the aqueous medium can further contain emulsifiers or suspension stabilizers. However, the aqueous medium preferably does not contain them.

In the production method of the present invention, when using the thermoplastic resin, which is made dispersible in the aqueous medium by means of neutralization, as the self-water-dispersible thermoplastic resin (P), neutralization is conducted using the neutralizer to impart the self-water dispersibility to the thermoplastic resin in any step up to the second step of dispersing the swollen material obtained by swelling the thermoplastic resin using the organic solvent (S) into the aqueous medium. It is particularly preferred to neutralize using the aqueous medium containing the neutralizer in the second step of dispersing the swollen material into the aqueous medium.

In the case in which the thermoplastic resin, which is made dispersible in the aqueous medium by means of neutralization, is an acid group-containing thermoplastic resin, examples of the neutralizer used to neutralize an acid group include alkali compounds such as sodium hydroxide, potassium hydroxide and lithium hydroxide; carbonates of alkali metals such as sodium, potassium and lithium; acetates of alkali metals; aqueous ammonia; alkylamines such as methylamine, dimethylamine, timethylamine, ethylamine, diethylamine and triethylamine; and alkanolamines such as diethanolamine. Among these neutralizers, aqueous ammonia is preferred.

In the case in which the thermoplastic resin, which is made dispersible in the aqueous medium by means of neutralization, is a basic group-containing thermoplastic resin, examples of the neutralizer used to neutralize an acid group include organic acids such as formic acid, acetic acid and propionic acid; and inorganic acids such as hydrochloric acid, sulfuric acid, nitric acid and phosphoric acid.

The amount of the neutralizers is preferably within a range from 0.9 to 5.0 equivalents, and more preferably from 1.0 to 3.0 equivalents, based on equivalents of the acid group in the acid group-containing thermoplastic resin or equivalents of the basic group in the basic group-containing thermoplastic resin.

Although the method of producing the swollen material in the first step of the production method of the present invention is not specifically limited, the swollen material is preferably produced by heating the self-water-dispersible thermoplastic resin (P) in the form of particles, together with the organic solvent (S), and the swollen material is more preferably produced under pressure because the swollen material can be obtained in a short time and it becomes easy to disperse the swollen material into the aqueous medium in the following second step. The heating temperature of the self-water-dispersible thermoplastic resin (P) and the organic solvent (S) is preferably equal to or higher than a boiling point of the organic solvent (S), more preferably from the boiling point of the organic solvent (S) to 180° C., and particularly preferably the boiling point of the organic solvent (S)+10° C. to 120° C. The pressure in the system is preferably within a range from 0.1 to 2.0 MPa, more preferably from 0.2 to 1.5 MPa, and still more preferably from 0.3 to 1.0 MPa, in terms of gauge pressure. Examples of the method of pressurizing the system include a method of vaporizing the organic solvent (S) by heating for preparing the swollen material, thereby pressurizing the system; and a method of introducing an inert gas into the system in advance, thereby preliminarily pressurizing the system, and vaporizing the organic solvent (S) by heating, thereby further pressurizing the system. Since reflux and boiling of the organic solvent (S) can be controlled and an aqueous dispersion of thermoplastic resin microparticles having a narrow particle size distribution can be obtained, the method of preliminarily pressurizing the system is preferred. The pressure applied preliminarily is preferably within a range from 0.05 to 0.5 MPa.

The method of preparing the initial aqueous dispersion by obtaining the swollen material in the first step and dispersing the resulting swollen material into the aqueous medium in the form of particles in the second step is not specifically limited, but is preferably a method of using the swollen material, which is obtained by heating to the temperature equal to or higher than the boiling point of the organic solvent (S) under pressure in the first step, and dispersing the swollen material into the aqueous medium in the form of microparticles at the temperature equal to or higher than the boiling point of the organic solvent (S) and lower than 120° C. under pressure by means of a mechanical shear force to prepare an initial aqueous dispersion because it becomes easy to disperse the swollen material into the aqueous medium. The temperature in the system is preferably within a range from the boiling point of the organic solvent (S) to 180° C., and particularly preferably from the boiling point of the organic solvent (S)+10° C. to 120° C. The pressure in the system is preferably within a range from 0.1 to 2.0 MPa, more preferably from 0.2 to 1.5 MPa, and still more preferably from 0.3 to 1.0 MPa in terms of gauge pressure. In the case in which preparation of the swollen material and preparation of the dispersion thereof are conducted in the same vessel, the heating and pressurizing conditions of the system at the beginning of the preparation of the dispersion are preferably the same as the temperature and pressure conditions upon completion of the preparation of the swollen material. The temperature of the aqueous medium used herein is preferably equal to or higher than the boiling point or higher of the organic solvent (S) and lower than 120° C., and more preferably equal to or higher than the boiling point or higher of the organic solvent (S) and lower than 100° C. and is within a range from the temperature of the system upon beginning of the second step −20° C. to the temperature of the system upon beginning of the second step.

Both the temperature during the preparation of the swollen material in the first step and the temperature during the preparation of the initial aqueous dispersion in the second step are preferably lower than the melting point and the softening point of the self-water-dispersible thermoplastic resin (P) and may be the temperature equal to or lower than the glass transition temperature (Tg) of the self-water-dispersible thermoplastic resin (P), and preferably equal to or higher than the boiling point of the organic solvent (S) and is 10 to 50° C. higher than the glass transition temperature (Tg). The temperature during the preparation of the swollen material in the first step and the temperature during the preparation of the initial aqueous dispersion in the second step may be the same or different.

Typical method for preparing the aqueous dispersion of thermoplastic resin microparticles of the present invention includes the following methods (i) to (iii).

(i) Method of preparing the dispersion wherein microparticles of a self-water-dispersible thermoplastic resin (P) are dispersed in an aqueous medium, comprising the first step of charging the self-water-dispersible thermoplastic resin (P) and an organic solvent (S) in a closed vessel and swelling the self-water-dispersible thermoplastic resin (P) using the organic solvent (S) while heating, preferably heating under pressure, while stirring to preapre a swollen material; the second step of dispersing the resulting swollen material into an aqueous medium, which may contain a neutralizer, in the form of microparticles by means of a mechanical shear force such as stirring, preferably under pressure with heating, to prepare an initial aqueous dispersion; and the third step of removing the organic solvent (S) from the resulting initial aqueous dispersion.

(ii) Method of preparing the dispersion wherein microparticles of a self-water-dispersible thermoplastic resin (P) are dispersed in an aqueous medium, comprising the first step of obtaining the swollen material in the same manner as in the first step of (i); the second step of dispersing the resulting swollen material into an aqueous medium, which may contain a neutrailzier, in the form of microparticles by means of a mechanical shear force while continuously supplying the swollen material and the aqueous medium in a continuous emulsifying dispersing machine to prepare an initial aqueous dispersion; and the third step of removing the organic solvent (S) from the resulting initial aqueous dispersion.

(iii) Method of preparing the dispersion wherein microparticles of a self-water-dispersible thermoplastic resin (P) are dispersed in an aqueous medium, comprising the first step of continuously supplying an organic solvent (S) to a self-water-dispersible thermoplastic resin (P) melted by melt-kneading in an extruder or a synthesized molten self-water-dispersible thermoplastic resin (P) by means of injection under pressure, swelling the self-water-dispersible thermoplastic resin (P) using the organic solvent (S) while stirring to prepare a swollen material and cooling the resulting swollen material to the temperature lower than a melting point or a softening point of the self-water-dispersible thermoplastic resin (P); the second step of dispersing the resulting swollen material into an aqueous medium, which may contain a neutralizer, in the form of microparticles by means of a mechanical shear force while continuously supplying the swollen material and the aqueous medium in a continuous emulsifying dispersing machine to prepare an initial aqueous dispersion; and the third step of removing the organic solvent (S) from the resulting initial aqueous dispersion.

Among these methods, the above method (i) or (ii) is preferred because the aqueous dispersion of thermoplastic resin microparticles can be obtained comparatively easily. The self-water-dispersible thermoplastic resin (P) used in the methods (i) and (ii) is preferably in the form of particles because the swollen material can be prepared in a relatively short time. Examples thereof include pellets having a particle diameter of 1 to 7 mm, coarse ground particles obtained by passing through a screen having a pore diameter of 2 to 7 mm and powders having an average particle diameter of 800 µm or less.

More specific examples of the method for producing the aqueous dispersion of thermoplastic resin microparticles using the above method (i) or (ii) will now be described.

First, using a 2 L glass autoclave equipped with a propeller blade, particles obtained by grinding a self-water-dispersible thermoplastic resin (P) and an organic solvent (S) are charged in the autoclave and, after preliminarily pressurizing the autoclave to 0.05 to 0.5 MPa by introducing an inert gas, a portion of the organic solvent (S) is vaporizing by heating to equal to or higher than a boiling point of the organic solvent (S) while stirring at 10 to 300 rpm, thereby pressurizing the autoclave to 0.1 to 2.0 MPa (gauge pressure). While stirring at 50 to 700 rpm for 3 to 60 minutes, the self-water-dispersible thermoplastic resin (P) is swollen using the organic solvent (S) to prepare a swollen material (first step).

Examples of the inert gas used to preliminarily pressurize include nitrogen gas, helium gas, neon gas, and argon gas. Among these inert gasses, a nitrogen gas is preferred.

The swollen material obtained in this step is a mixture of the self-water-dispersible thermoplastic resin (P), which absorbed the organic solvent (S), and the organic solvent (S) remaining without being absorbed into the self-water-dispersible thermoplastic resin (P), and is preferably translucent or white turbid paste. In the system of a polyester resin and isopropyl alcohol, when the stirring rate is lowered to about 50 rpm, isopropyl alcohol is separated from a resin phase to form two phases, which does not cause a problem.

After obtaining the swollen material in such a manner, according to the method (i), the aqueous medium such as water or aqueous ammonia preheated while stirring at 300 to 1500 rpm is injected under pressure over 2 to 30 minutes, thereby causing phase inversion emulsification to prepare an initial aqueous dispersion wherein the swollen material is dispersed in the form of microparticles (the second step). It is believed that, at this time, local boiling and reflux of the organic solvent (S) in the swollen material occurred and molecules of the organic solvent (S) having low affinity with the self-water-dispersible thermoplastic resin (P) are likely to be separated from the self-water-dispersible thermoplastic resin (P) and tend to cause phase inversion emulsification.

According to the method (ii), after obtaining the swollen material, the swollen material is continuously dispersed into the aqueous medium in the form of microparticles to prepare a dispersion (the second step) using a continuous emulsifying dispersing machine, for example, a high-speed rotationally continuous emulsifying dispersing machine comprising a ring-shaped stator having slits and a ring-shaped rotor having slits, that are coaxially provided. In this case, the swollen material and the aqueous medium may be supplied into the continuous emulsifying dispersing machine under predetermined temperature and pressure conditions, followed by rotation of the rotor at 300 to 10000 rpm (see Japanese Unexamined Patent Application, First Publication, No. Hei 09-311502, corresponding U.S. Pat. No. 5,843,614 (pages 6 to 8, FIGS. 1 to 4)).

After obtaining the dispersion wherein the swollen material is dispersed in the form of microparticles, the organic solvent (S) is removed from the resulting dispersion to prepare a dispersion wherein microparticles of the self-water-dispersible thermoplastic resin (P) are dispersed in the aqueous medium(third step). Examples of the method of removing the organic solvent (S) include a method of spraying in a vacuum chamber, a method of forming a thin film on the inner wall surface of a desolvation can and a method of passing through a desolvation can filled with a filler for absorbing a solvent. A removing method using a rotary evaporator is described as an example of the method of removing the organic solvent (S).

Amount of sample: 500 ml
Vessel: 2 L Kjeldahl flask
Rotational speed: 60 rpm
Bath temperature: 47° C.
Vacuum degree: The vacuum degree is increased to 1.33 KPa from 13.3 KPa over 20 minutes and then desolvation is conducted at 1.33 KPa for 10 minutes.

In the case in which resin microparticles in the aqueous dispersion of thermoplastic resin microparticles are employed in a powder coating composition and a hot melt adhesive or the resulting particles is taken out in the form of powders such as toner, the organic solvent (S) is preferably removed from the dispersion in which resin microparticles are dispersed immediately after the production of the dispersion for the following reason. That is, when the dispersion is stored for a long period without removing the organic solvent (S), resin microparticles in the dispersion tend to agglomerate naturally.

According to the method for producing the aqueous dispersion of thermoplastic resin microparticles of the present invention, the average particle diameter of resin microparticles in the aqueous dispersion of thermoplastic resin microparticles can be arbitrarily controlled with a range from about 0.01 to 50 μm by changing the manufacturing conditions.

In the method for producing the aqueous dispersion of thermoplastic resin microparticles of the present invention, the following means may be employed to control the average particle diameter of resin microparticles in the resulting dispersion to a small value.

(i) The concentration of a hydrophilic segment of an acid group or a neutralized acid group in the self-water-dispersible thermoplastic resin (P) is increased.

(ii) When using a thermoplastic resin, which is made dispersible in the aqueous medium by means of neutralization, as the self-water-dispersible thermoplastic resin (P), the amount of the neutralizer is increased.

(iii) The amount of the organic solvent (S) is increased relative to the self-water-dispersible thermoplastic resin (P).

(iv) The temperature during the production of the dispersion is raised.

(v) The stirring rate during the production of the dispersion is increased.

In contrast, in the method for producing the aqueous dispersion of thermoplastic resin microparticles of the present invention, reverse conditions may be employed to increase the average particle diameter of resin microparticles in the resulting dispersion. Also, the average particle diameter of resin microparticles in the resulting dispersion is increased by using the self-water-dispersible thermoplastic resin (P) and/or the organic solvent (S) in combination with other components, for example, colorants (C) such as carbon black, and additives such as magnetic powders, waxes and charge control agents.

The resulting resin particles in the aqueous dispersion of thermoplastic resin microparticles obtained by the production method of the present invention can be grown into larger particles by associating dispersed resin microparticles while controlling the conditions such as temperature, pH and electrolyte concentration of the resulting dispersion.

Also, organic solvent (S) used in the present invention serves as an adhesive for bonding resin microparticles in the following step of associating resin microparticles in the dispersion. Usually, although desolvation in the third step is conducted after the completion of the association step, the dispersion may be stored after desolvation before the association step and a requisite amount of the same or similar organic solvent may be added in the association step, followed by association and further desolvation.

The toner for electrophotography of the present invention will now be described.

The toner for electrophotography of the present invention is a toner for electrophotography containing microparticles obtained by separating microparticles of the self-water-dispersible thermoplastic resin (P) from the dispersion prepared by the method for producing the aqueous dispersion of thermoplastic resin microparticles of the present invention and drying the microparticles.

The toner for electrophotography of the present invention will be described.

The toner for electrophotography of the present invention is a toner for electrophotography containing microparticles obtained by separating microparticles of the self-water-dispersible thermoplastic resin (P) from the dispersion prepared by the method for producing the aqueous dispersion of thermoplastic resin microparticles of the present invention and drying the microparticles, and examples thereof include a toner for electrophotography comprising resin microparticles obtained by using the dispersion obtained by the method of the present invention as it is, separating resin microparticles from the dispersion and drying the microparticles, and a toner for electrophotography comprising resin microparticles obtained by preparing a dispersion wherein microparticles having a particle size smaller than a toner size are dispersed using the method of the present invention, optionally mixing with a separately produced dispersion wherein microparticles having a particle size smaller than a toner size are dispersed, associating resin microparticles in the dispersion while controlling the conditions such as temperature, pH and electrolyte concentration of the resulting dispersion, to prepare microparticles having a toner size, followed by separation of particles and further drying.

Examples of the toner for electrophotography of the present invention include toners for electrophotography (1) to (4).

(1) A toner for electrophotography comprising microparticles obtained by the method for producing the aqueous dispersion of thermoplastic resin microparticles of the present invention, comprising the first step of swelling a self-water-dispersible thermoplastic resin (P) using an organic solvent (S) to prepare a dispersion in which colored resin microparticles obtained by using the self-water-dispersible thermoplastic resin (P) in combination with a colorant (C) are dispersed in an aqueous medium, separating microparticles of the self-water-dispersible thermoplastic resin (P) from the resulting dispersion and drying the microparticles. It is possible to use the colorant (C) in combination with additives such as waxes, magnetic powders, and charge control agents. In this case, the average particle diameter of colored resin microparticles in the dispersion is preferably within a range from 1 to 10 μm.

(2) A toner for electrophotography comprising microparticles obtained by preparing a dispersion in which colored resin microparticles are dispersed in an aqueous medium in the same manner as in the method (1), reducing the surface potential of resin microparticles by means of the addition of an anti-neutralizer, thereby associating dispersed resin microparticles to prepare a dispersion of colored resin particles having a larger average particle diameter and removing the organic solvent (S), followed by separation of microparticles and further drying. The organic solvent (S) may be removed after the association of resin particle. It is possible to use the colorant (C) in combination with additives such as waxes, magnetic powders, and charge control agents. In this case, the average particle diameter of colored resin microparticles in the dispersion before the association is preferably within a range from 0.01 to 1 μm and the average particle diameter of colored resin microparticles after the completion of the association is preferably a toner size.

(3) A toner for electrophotography comprising microparticles obtained by preparing a dispersion in which colored resin microparticles are dispersed in an aqueous medium in the same manner as in the method (1), associating resin microparticles in the same manner as in the method (2) to prepare a dispersion of colored resin particles (core particles) having a larger average particle diameter, mixing with a separately produced aqueous dispersion of resin microparticles for shell layer, associating with dispersed colored resin particles (core particles) with resin microparticles for shell layer in the same manner as in the method (2)

to prepare a dispersion of colored resin particles having a core-shell structure and removing the organic solvent (S), followed by separation of microparticles and further drying. The organic solvent (S) may be removed after the association of resin particles. In this case, the average particle diameter of colored resin microparticles in the dispersion before the association is preferably within a range from 0.01 to 1 μm and the average particle diameter of colored resin microparticles after the completion of the association is preferably a toner size.

The resin microparticles for shell layer used in the method (3) are preferably resin particles made of a self-water-dispersible thermoplastic resin (P) having Tg, which is 1 to 40° C. higher than a glass transition temperature (Tg) of resin particles for a core, or resin particles prepared by using a large amount of the charge control agent when resin microparticles are prepared by using the charge control agent described hereinafter.

(4) A toner for electrophotography comprising microparticles obtained by swelling a self-water-dispersible thermoplastic resin (P) using an organic solvent (S) to prepare a swollen material, dispersing the swollen material into an aqueous medium in the form of microparticles to prepare a dispersion, removing the organic solvent (S) from the resulting dispersion to prepare a dispersion in which microparticles of the self-water-dispersible thermoplastic resin (P) are dispersed in the aqueous, mixing with a separately produced aqueous medium dispersion of a colorant or a separately produced aqueous dispersion of colored resin microparticles, reducing the surface potential of resin microparticles by means of an anti-neutralizer, thereby associating resin microparticles with colorant particles or colored resin microparticles to prepare a dispersion of colored resin particles having a larger average particle diameter, followed by separation of microparticles and further drying. In this case, it is possible to use the colorant (C) in combination with additives such as waxes, magnetic powders and charge control agents, or association can be conducted by using in combination with an aqueous dispersion of resin microparticle containing additives, magnetic powders and charge control agents. The organic solvent (S) may be removed after the association of resin particles and colored particles or colored resin microparticles. The average particle diameter of microparticles used in the respective dispersions used herein is preferably within a range from 0.01 to 1 μm and the average particle diameter of colored resin microparticles after the completion of the association is preferably a toner size.

The separately produced aqueous dispersion of the colorant or the separately produced aqueous dispersion of colored resin microparticles used in the method (4) are not specifically limited as long as the colorant or colored resin microparticles are dispersed in the aqueous medium in the form of microparticles, and examples thereof include an aqueous dispersion obtained by emulsifying a colorant using a surfactant, aqueous dispersion obtained by melting a colorant (C) and a resin with heating and dispersing the melt in water containing a dispersant, an aqueous dispersion obtained by dissolving a self-water-dispersible resin containing a colorant (C) dispersed therein in an organic solvent and adding water to cause phase inversion emulsification, and an aqueous dispersion obtained by using a colorant (C) in combination in the case of swelling a self-water-dispersible thermoplastic resin (P) using an organic solvent (S) according to the production method of the present invention. Among these aqueous dispersions, the aqueous dispersion obtained by the production method of the present invention is preferred. The concentration of the colorant (C) in the aqueous dispersion is preferably 5 to 10 times as that of the colorant of the objective toner.

Examples of the colorants (C) include carbon black, red iron oxide, Prussian Blue, titanium oxide, nigrosine dye (C.I. No. 50415B), Aniline Blue (C.I. No. 50405), Kalco Oil Blue (C.I. No. azoic Blue 3), Chrome Yellow (C.I. No. 14090), Ultramarine Blue (C.I. No. 77103), DuPont Oil Red (C.I. No. 26105), Quinoline Yellow (C.I. No. 47005), Methylene Blue Chloride (C.I. No. 52015), Phthalocyanine Blue (C.I. No. 74160), Malachite Green Oxalate (C.I. No. 74160), Malachite Green Oxalate (C.I. No. 42000), Lamp Black (C.I. No. 77266) and Rose Bengal (C.I. No. 45435).

The colorant (C) is preferably used in the amount within a range from 1 to 20 parts by weight based on 100 parts by weight of the self-water-dispersible thermoplastic resin (P). These colorants may be used alone or in combination.

As used herein, the step and the phenomenon of "association" in the production method of the present invention will now be described.

Generally, resin microparticles in the aqueous dispersion of thermoplastic resin microparticles obtained by the production method of the present invention stably exist in the aqueous medium without agglomerating by an electrostatic repulsion arising from surface charges and, at the same time, an attraction is applied between resin particles by a Van der Waals force. Therefore, when surface charges of resin particles are appropriately reduced by any action, the attractive forces will increase surpassing the electrostatic repulsive forces and resin microparticles begins to agglomerate with each other, resulting in a dispersion of grown resin particles having a larger particle diameter. This phenomenon is referred to as "association" in the present invention. The association temperature is preferably within a range from a glass transition temperature (Tg) of the self-water-dispersible thermoplastic resin (P) to the glass transition temperature +50° C. Because of the relation with the boiling point of the organic solvent (S), which exists in the system of the association, it is more preferred to heat under pressure within a range from 0.1 to 1.0 MPa (gauge pressure). The time required for association is usually within a range from 2 to 12 hours, and preferably from 4 to 10 hours. The association is preferably conducted under gentle stirring, for example, stirring at a rotational speed of about 10 to 100 rpm using an anchor blade.

Examples of the method of reducing or removing surface charges of resin particles includes a method of adding acids such as dilute hydrochloric acid, dilute sulfuric acid, acetic acid, formic acid and carbonic acid as a so-called anti-neutralizer. In this case, salting-out agents, for example, metal salts such as sodium chloride, potassium chloride, aluminum sulfate, ferric sulfate and calcium chloride, and complexes of metals such as calcium, aluminum, magnesium and iron can be optionally added. Also, surfactants may be used for the purpose of dispersing the colorant and controlling the progress of association in the association step.

Examples of the surfactant include anionic surfactants such as sodium dodecylbenzenesulfonate and sodium alkyldiphenyldisulfonate; cationic surfactants such as trimethylstearyl ammonium chloride; and nonionic surfactants such as alkylphenoxypoly (ethyleneoxy)ethanol can be appropriately selected and used.

The process for producing the toner for electrophotography according to the present invention is particularly preferred when producing a toner for electrophotography having a particle diameter within a range from 1 to 10 μm.

According to the production method of the present invention, it is possible to prepare a water dispersion resin comprising spherical resin particles having a shape free from a sharp-pointed parts, and a toner. As used herein, the term "spherical" refers to wide concept including ellipse and irregular sphere (potato-shape), in addition to perfect sphere In the method for producing the aqueous dispersion of thermoplastic resin microparticles of the present invention and the toner for electrophotography of the present invention, additives such as magnetic powders and waxes may be used, if necessary. These additives may be kneaded in advance with the self-water-dispersible thermoplastic resin (P) to prepare a kneaded mixture. These additives may be used alone, or two or more kinds thereof may be used in combination.

Examples of the magnetic powder include metal substances such as magnetite, ferrite, cobalt, iron and nickel, and alloys thereof.

Waxes can be used as an anti-offset agent for a toner for electrophotography. Examples of the wax include synthetic waxes such as polypropylene wax, polyethylene wax, Fischer-Tropsch wax, stearyl bisamide and oxidized wax; and natural waxes such as carnauba wax and rice wax.

When using a charge control agent, a toner having good chargeability can be obtained. Examples of the charge control agent include positive charge control agents such as nigrosine electron donative dye, naphthenic acid, metal salt of higher fatty acid, alkoxylated amine, quaternary ammonium salt, alkylamide, metal complex, pigment and fluorine-treated active agent; and negative charge control agents such as electron acceptive organic complex, chlorinated paraffin, chlorinated polyester and sulfonylamine of copper phthalocyanin.

The charge control agent may be added to the self-water-dispersible thermoplastic resin (P) in the form of a solution prepared in advance by dissolving the charge control agent in the organic solvent (S). In the case of producing a toner comprising core particles and a shell layer, a toner comprising the shell layer containing the charge control agent can be produced by using the charge control agent in the preparation of the shell layer.

In the present invention, the proportion of the non-volatile component in the aqueous dispersion of thermoplastic resin microparticles was determined from a change in weight of the aqueous dispersion after allowing the aqueous dispersion in a vacuum drier under the conditions of a temperature of 100° C. under a pressure of 0.1 KPa for 3 hours. The particle diameter of microparticles was measured as follows, for examples, the particle diameter of 0.001 to 2 μm was measured by using MICROTRAC UPA150 manufactured by Leeds & Northrop Inc., while the particle diameter of 1 to 40 μm was measured by using Multisizer™ 3 manufactured by Beckman Coulter Inc.

Also, the amount of the residual solvent in the aqueous dispersion of thermoplastic resin microparticles was determined by gas chromatography under the following conditions.
Measuring apparatus: Shimadzu GC-17A
Column: ULBON HR-20M (PPG)
Column temperature: 80 to 150° C.
Heating rate: 10° C./min.

EXAMPLES

The following Synthesis Examples, Examples and Comparative Examples further illustrate the present invention in detail. In the Examples, parts and percentages are by weight unless otherwise specified.

Synthesis Example 1 Synthesis of Carboxyl Group-Containing Polyester Resin (I)

192 Parts of ethylene glycol, 324 parts of neopentyl glycol, 996 parts of terephthalic acid and 1.0 parts of tetrabutyl titanate were charged in a 2 liter glass four-necked flask equipped with a rectifier and a condenser and, after gradually heating under a nitrogen flow, the reaction was conducted at 240° C. for 8 hours. The amounts of ethylene glycol and neopentyl glycol accompanied by condensed water produced with the progress of the reaction were measured by analyzing the condensed water and the reaction was allowed to proceed while filling to prepare a polyester resin (I-1) which is solid at normal temperature and has an acid value of 10 (mg KOH/g). The glass transition temperature (Tg) as measured by differential scanning calorimetry (DSC) of the polyester resin (I-1), the softening point as measured by a ring and ball method, the ½ descendent temperature ($T_{1/2}$) as measured by using a flow tester, the gel fraction, Mw, Mn, Mw/Mn and the acid value are shown in Table 3.

Synthesis Example 2 to Synthesis Example 5 (the Same as Above)

In the same manner as in Synthesis Example 1, except that raw materials were used in accordance with the formulation shown in Table 1, carboxyl group-containing polyester resins (I-2) to (I-5) were obtained. The glass transition temperature (Tg) as measured by differential scanning calorimetry (DSC) of the polyester resins (I-2) to (I-5), the softening point as measured by a ring and ball method, the ½ descendent temperature ($T_{1/2}$) as measured by using a flow tester, the gel fraction, Mw, Mn, Mw/Mn and the acid value are shown in Table 3.

Synthesis Example 6 Synthesis of Carboxyl Group-Containing Polyester Resin (II)

224 Parts of ethylene glycol, 250 parts of neopentyl glycol, 996 parts of terephthalic acid, 17 parts of EPICLON 830 (bisphenol F difunctional epoxy resin, manufactured by DAINIPPON INK AND CHEMICALS, INC.), 30 parts of Cardula E10 (neodecanoic acid glycidyl ester, manufactured by Shell Japan Co., Ltd.) and 1.0 parts of dibutyltin oxide were charged in a glass four-necked flask and, after gradually heating under a nitrogen flow, the reaction was conducted at 245° C. for 18 hours. The amounts of ethylene glycol and neopentyl glycol accompanied by condensed water produced with the progress of the reaction were measured by analyzing the condensed water and the reaction was allowed to proceed while filling to prepare a polyester resin (II-1) which is solid at normal temperature and has an acid value of 9 (mg KOH/g). The glass transition temperature (Tg) as measured by differential scanning calorimetry (DSC) of the polyester resin (II-1), the softening point as measured by a ring and ball method, the ½ descendent temperature ($T_{1/2}$) as measured by using a flow tester, the gel fraction, Mw, Mn, Mw/Mn and the acid value are shown in Table 4.

Synthesis Example 7 and Synthesis Example 8 (the Same as Above)

In the same manner as in Synthesis Example 6, except that raw materials were used in accordance with the formulation shown in Table 2, a carboxyl group-containing polyester resins (II-2) and (II-3) were obtained. The glass transition temperature (Tg) as measured by differential scanning calorimetry (DSC) of the polyester resins (II-1) and (II-3), the softening point as measured by a ring and ball method, the ½ descendent temperature ($T_{1/2}$) as measured by using a flow tester, the gel fraction, Mw, Mn, Mw/Mn and the acid value are shown in Table 4.

TABLE 1

| Items | Synthesis Examples | | | | |
|---|---|---|---|---|---|
| | 1 | 2 | 3 | 4 | 5 |
| Polyester resin | I-1 | I-2 | I-3 | I-4 | I-5 |
| Acid component | | | | | |
| Terephthalic acid | 996 | 498 | 664 | 918 | 996 |
| Isophthalic acid | | 498 | | 20 | |
| Trimellitic acid anhydride | | | | 28 | |
| PTBPA | | | | 30 | |
| SBASS | | | | | 134 |
| Alcohol component | | | | | |
| Ethylene glycol | 192 | 192 | | 179 | 205 |
| Propylene glycol | | 235 | | | |
| Neopentyl glycol | 324 | | | 301 | 344 |
| BPA-EO | | | 780 | | |
| CHDM | | | 230 | | |

TABLE 2

| Items | Synthesis Examples | | |
|---|---|---|---|
| | 6 | 7 | 8 |
| Polyester resin | II-1 | II-2 | II-3 |
| Acid component | | | |
| Terephthalic acid | 996 | 996 | 996 |
| Isophthalic acid | | | |
| Alcohol component | | | |
| Ethylene glycol | 224 | | |
| Propylene glycol | | 228 | 228 |
| Neopentyl glycol | 250 | 312 | |
| BPA-EO | | | |
| CHDM | | | 432 |
| Difunctional epoxy compound | | | |
| 830 | | 17 | 33 |
| 850 | | 25 | |
| Monoepoxy compound | | | |
| CE-10 | 30 | 50 | 45 |

Abbreviations in Table 1 and Table 2 are as follows.
PTBBA: para-tertiary butylbenzoic acid
SBASS: sulfobenzoic acid sodium salt
BPA-EO: ethylene oxide (2.2 mol) adduct of bisphenol A
CHDM: cyclohexanedimethanol
830: bisphenol F epoxy resin EPICLON 830, manufactured by DAINIPPON INK AND CHEMICALS, INC.
850: bisphenol A epoxy resin EPICLON 850, manufactured by DAINIPPON INK AND CHEMICALS, INC.
CE-10: neodecanoic acid glycidyl ester Cardula E-10, manufactured by Shell Japan Co., Ltd.

TABLE 3

| Polyester resin | I-1 | I-2 | I-3 | I-4 | I-5 |
|---|---|---|---|---|---|
| Softening point (° C.) | 98 | 103 | 108 | 112 | 117 |
| Tg (° C.) | 53 | 57 | 63 | 65 | 67 |
| $T_{1/2}$ (° C.) | 104 | 110 | 115 | 118 | 123 |

TABLE 3-continued

| Polyester resin | I-1 | I-2 | I-3 | I-4 | I-5 |
|---|---|---|---|---|---|
| Gel fraction (%) | <0.01 | 0.02 | <0.01 | <0.01 | <0.01 |
| Mw | 5900 | 7100 | 10500 | 17500 | 20100 |
| Mn | 2400 | 3000 | 3500 | 3300 | 6900 |
| Mw/Mn | 2.46 | 2.37 | 3.00 | 5.3 | 2.9 |
| Acid value | 10 | 12 | 9 | 28 | 2.4 |

TABLE 4

| Polyester resin | II-1 | II-2 | II-3 |
|---|---|---|---|
| Softening point (° C.) | 192 | 172 | 186 |
| Tg (° C.) | 69 | 65 | 71 |
| $T_{1/2}$ (° C.) | 202 | 189 | 199 |
| Gel fraction (%) | 0.3 | 0.5 | 1.4 |
| Mw | 387400 | 432600 | 452300 |
| Mn | 6700 | 6300 | 6200 |
| Mw/Mn | 57.8 | 68.7 | 73.0 |
| Acid value | 9 | 10 | 11 |

Example 1

Under the conditions that the concentration of each resin was 10%, the solubility in acetone of a polyester resin (I-4) and that of a polyester resin (II-1) were determined according to criteria described in 7.2.1.1 to 7.2.1.3 of ASTM D3132-84 (Reapproved 1996). As a result, the polyester resin (I-4) was evaluated as "Borderline Solution", while the polyester resin (II-1) was evaluated as "Insoluble".

45 Parts of a coarse ground particles (obtained by passing through a screen having a pore diameter of 3 mm, the same as hereinafter) of the polyester resin (I-4), 55 parts of coarse ground particles of the polyester resin (II-1) and 100 parts of acetone were charged in a 2 L autoclave equipped with a propeller blade and, after preliminarily pressurizing to 0.2 MPa using a nitrogen gas, the autoclave was heated while rotating the propeller blade at 100 rpm until the temperature in the system reached 90° C. As a result, the pressure in the autoclave increased to 0.45 MPa. After the temperature in the system reached 90° C., the rotational speed of the propeller blade was increased to 500 rpm and acetone was absorbed into the coarse ground particles while stirring for 10 minutes to prepare a translucent pasty swollen material. After the rotational speed of the propeller blade was increased to 1000 rpm, 402 parts of aqueous ammonia having a concentration of 0.123% preheated to 90° C. was injected under pressure over 5 minutes to prepare a white turbid initial aqueous dispersion in which the swollen material is dispersed into water in the form of microparticles. While stirring continuously, the resulting initial aqueous dispersion was immediately water-cooled to 30° C. and taken out, and then acetone was distilled off under the conditions of a temperature of 47° C. for 30 minutes using a rotary evaporator to prepare an aqueous dispersion of polyester resin microparticles. The particle diameter of the resin in the resulting aqueous dispersion of polyester resin microparticles was measured. As a result, the average particle diameter was 0.16 µm. The amount of the residual acetone was measured by gas chromatography. As a result, it was 360 ppm. The proportion of the non-volatile component in the resulting aqueous dispersion of polyester resin microparticles was measured. As a result, it was 25%.

Example 2

100 Parts of carbon black (Regal R330) manufactured by Cabot Corporation, 45 parts of a polyester resin (I-4) and 55 parts of a polyester resin (II-1) were melt-kneaded by using a pressure kneader to prepare a kneaded mixture. 100 Parts of coarse ground particles of the kneaded mixture and 100 parts of acetone were charged in a 2 L autoclave equipped with a propeller blade and, after preliminarily pressurizing to 0.2 MPa using a nitrogen gas, the autoclave was heated while rotating the propeller blade at 100 rpm until the temperature in the system reached 90° C. As a result, the pressure in the autoclave increased to 0.45 MPa. After the temperature in the system reached 90° C., the rotational speed of the propeller blade was increased to 500 rpm and acetone was absorbed into the coarse ground particles while stirring for 10 minutes to prepare a black pasty swollen material. After the rotational speed of the propeller blade was increased to 1000 rpm, 405 parts of aqueous ammonia having a concentration of 0.31% preheated to 90° C. was injected under pressure over 5 minutes to prepare a black initial aqueous dispersion in which the swollen material is dispersed into water in the form of microparticles. While stirring continuously, the resulting initial aqueous dispersion was immediately water-cooled to 30° C. and taken out, and then acetone was distilled off under the conditions of a temperature of 47° C. for 30 minutes using a rotary evaporator to prepare an aqueous dispersion of polyester resin microparticles. The particle diameter of the resin in the resulting aqueous dispersion of polyester resin microparticles was measured. As a result, the average particle diameter was 0.3 μm. The amount of the residual acetone was measured by gas chromatography. As a result, it was 300 ppm. The proportion of the non-volatile component in the resulting aqueous dispersion of polyester resin microparticles was measured. As a result, it was 25%.

Example 3

100 Parts of polypropylene wax "Biscoal 550P" manufactured by Sanyo Chemical Industries, Ltd., 100 parts of coarse ground particles of a polyester resin (I-4) and 100 parts of acetone were charged in a 2 L autoclave equipped with a propeller blade and, after preliminarily pressurizing to 0.2 MPa using a nitrogen gas, the autoclave was heated while rotating the propeller blade at 100 rpm until the temperature in the system reached 150° C. As a result, the pressure in the autoclave increased to 1.25 MPa. After the temperature in the system reached 150° C., the rotational speed of the propeller blade was increased to 500 rpm and acetone was absorbed into the coarse ground particles while stirring for 10 minutes to prepare a white turbid and pasty swollen material. After the rotational speed of the propeller blade was increased to 1000 rpm, 405 parts of aqueous ammonia having a concentration of 0.31% preheated to 90° C. was injected under pressure over 5 minutes to prepare an initial aqueous dispersion in which the swollen material is dispersed into water in the form of microparticles. While stirring continuously, the resulting initial aqueous dispersion was immediately water-cooled to 30° C. and taken out, and then acetone was distilled off under the conditions of a temperature of 47° C. for 30 minutes using a rotary evaporator to prepare an aqueous dispersion of polyester resin microparticles. The particle diameter of the resin in the resulting aqueous dispersion of polyester resin microparticles was measured. As a result, the average particle diameter was 0.8 μm. The amount of the residual acetone was measured by gas chromatography. As a result, it was 200 ppm. The proportion of the non-volatile component in the resulting aqueous dispersion of polyester resin microparticles was measured. As a result, it was 25%.

Example 4

100 Parts of a charge control agent "BONTRON E-80" manufactured by Orient Chemical Industries, Ltd., 45 parts of a polyester resin (I-4) and 55 parts of a polyester resin (II-1) were melt-kneaded by using a pressure kneader to prepare a kneaded mixture. 100 Parts of coarse ground particles of the kneaded mixture and 100 parts of acetone were charged in a 2 L autoclave equipped with a propeller blade and, after preliminarily pressurizing to 0.2 MPa using a nitrogen gas, the autoclave was heated while rotating the propeller blade at 100 rpm until the temperature in the system reached 90° C. As a result, the pressure in the autoclave increased to 0.45 MPa. After the temperature in the system reached 90° C., the rotational speed of the propeller blade was increased to 500 rpm and acetone was absorbed into the coarse ground particles while stirring for 10 minutes to prepare a lavender pasty swollen material. After the rotational speed of the propeller blade was increased to 1000 rpm, 404 parts of aqueous ammonia having a concentration of 0.25% preheated to 90° C. was injected under pressure over 5 minutes to prepare an initial aqueous dispersion in which the swollen material is dispersed into water in the form of microparticles. While stirring continuously, the resulting initial aqueous dispersion was immediately water-cooled to 30° C. and taken out, and then acetone was distilled off under the conditions of a temperature of 47° C. for 30 minutes using a rotary evaporator to prepare a lavender aqueous dispersion of polyester resin microparticles. The particle diameter of the resin in the resulting aqueous dispersion of polyester resin microparticles was measured. As a result, the average particle diameter was 0.3 μm. The amount of the residual acetone was measured by gas chromatography. As a result, it was 300 ppm. The proportion of the non-volatile component in the resulting aqueous dispersion of polyester resin microparticles was measured. As a result, it was 25%.

Example 5

In an autoclave equipped with an anchor blade and a condenser, 280 parts of the aqueous dispersion of polyester resin microparticles obtained in Example 1, 56 parts of the aqueous dispersion of polyester resin microparticles obtained as a colorant masterbatch in Example 2, 40 parts of the aqueous dispersion of polyester resin microparticles obtained as an anti-offset agent masterbatch in Example 3 and 24 parts of the aqueous dispersion of polyester resin microparticles obtained as a charge control agent masterbatch in Example 4 were charged and 40 parts of acetone was added while rotating the anchor blade at 50 rpm, followed by heating to 50° C. While heating to 90° C. over 6 hours, 20 parts of 2% dilute hydrochloric acid, 20 parts of a 1% aluminum sulfate solution and 10 parts of a 1% sodium dodecylbenzenesulfonate solution were added dropwise, thereby associating with the resin particles to prepare an aqueous dispersion of polyester resin microparticles. Using a rotary evaporator, acetone was distilled off under the conditions of a temperature of 47° C. for 60 minutes, followed by washing with deionized water three times and further dehydration condensation to prepare polyester resin particles. The resulting polyester resin particles were mixed with Aerosil R-974 (silica, manufactured by Japan Aerosil Inc.) in an amount of 0.3% based on the weight of the resin particles in a Henschel mixer to prepare particles (toner) having an average particle diameter of 6.0 μm. The amount of the residual acetone of the resulting toner was measured by gas chromatography. As a result, it was 20 ppm (detection limit) or less.

Example 6

In an autoclave equipped with an anchor blade and a condenser, 280 parts of the aqueous dispersion of polyester resin microparticles obtained in Example 1, a colorant obtained by adding 0.05 parts of a surfactant and 10 parts of deionized water to 5 parts of carbon black (Regal R330) manufactured by Cabot Corporation and treating the resulting mixture using a homogenizer, an emulsion obtained by emulsifying polypropylene wax "Biscoal 550P" manufactured by Sanyo Chemical Industries, Ltd., in an amount of 2 parts calculated in terms of the solid content and a solution prepared by dissolving 1.5 parts of a charge control agent "T-77" manufactured by Hodogaya Chemical Co., Ltd., in 35 parts of acetone were charged, followed by heating to 50° C. while rotating the anchor blade at 50 rpm. While heating to 90° C. over 6 hours, 20 parts of 2% dilute hydrochloric acid, 20 parts of a 1% aluminum sulfate solution and 10 parts of a 1% sodium dodecylbenzenesulfonate solution were added dropwise, thereby associating with the resin particles to prepare an aqueous dispersion of polyester resin microparticles. Using a rotary evaporator, acetone was distilled off under the conditions of a temperature of 47° C. for 60 minutes, followed by washing with deionized water three times and further dehydration condensation to prepare polyester resin particles. The resulting polyester resin particles were mixed with Aerosil R-974 (silica, manufactured by Japan Aerosil Inc.) in the amount of 0.3% based on the weight of the resin particles in a Henschel mixer to prepare particles (toner) having an average particle diameter of 6.0 μm. The amount of the residual acetone of the resulting toner was measured by gas chromatography. As a result, it was 20 ppm (detection limit) or less.

Example 7

In the same manner as in Example 1, the solubility in acetone of a polyester resin (I-2) and that of a polyester resin (II-2) were evaluated under the conditions in which the concentration of each resin was 10%. As a result, the polyester resin (I-2) was evaluated as "Borderline Solution", while the polyester resin (II-2) was evaluated as "Insoluble".

36 Parts of the polyester resin (I-2), 54 parts of the polyester resin (II-2), 7 parts of carbon black MA-11 (manufactured by Mitsubishi Chemical Co.), 1.5 parts of BONTRON E-81 (charge control agent, manufactured by Orient Chemical Industries, Ltd.) and 3.5 parts of Biscoal 550P (polypropylene wax, manufactured by Sanyo Chemical Industries, Ltd.) were mixed by using a Henschel mixer and then melt-kneaded by using a pressure kneader to prepare a kneaded mixture. 100 Parts of coarse ground particles of the kneaded mixture and 30 parts of acetone were charged in a 2 L autoclave equipped with a propeller blade and, after preliminarily pressurizing to 0.2 MPa using a nitrogen gas, the autoclave was heated while rotating the propeller blade at 100 rpm until the temperature in the system reached 90° C. As a result, the pressure in the autoclave increased to 0.40 MPa. After the temperature in the system reached 90° C., the rotational speed of the propeller blade was increased to 500 rpm and acetone was absorbed into the coarse ground particles while stirring for 10 minutes to prepare a black pasty swollen material. Then, 401.5 parts of aqueous ammonia having a concentration of 0.094% preheated to 90° C. was injected under pressure over 5 minutes to prepare a black initial aqueous dispersion in which the swollen material is dispersed into water in the form of microparticles. While stirring continuously, the resulting initial aqueous dispersion was immediately water-cooled to 30° C. and taken out and acetone was distilled off at 47° C. over 30 minutes using a rotary evaporator, followed by washing once with deionized water, dehydration and further drying to prepare polyester resin particles. The resulting polyester resin particles were mixed with Aerosil R-974 (silica, manufactured by Japan Aerosil Inc.) in the amount of 0.3% based on the weight of the resin particles in a Henschel mixer to prepare particles (toner) having an average particle diameter of 6.5 μm. The amount of the residual acetone of the resulting toner was measured by gas chromatography. As a result, it was 20 ppm (detection limit) or less.

Example 8

In the same manner as in Example 1, the solubility in acetone of a polyester resin (I-1), that of a polyester resin (I-3) and that of the polyester resin (II-3) were evaluated under the conditions that the concentration of each resin was 10%. As a result, the polyester resin (I-1) and the polyester resin (I-3) was evaluated as "Borderline Solution", while the polyester resin (II-3) was evaluated as "Insoluble".

70 Parts of the polyester resin (I-1), 30 parts of the polyester resin (II-3), 100 parts of carbon black (Regal R330) manufactured by Cabot Corporation and 5 parts of Biscoal 550P were melt-kneaded by using a pressure kneader to prepare a kneaded mixture. 100 Parts of coarse ground particles of the kneaded mixture and 100 parts of acetone were charged in a 2 L autoclave equipped with a propeller blade and, after preliminarily pressurizing to 0.2 MPa using a nitrogen gas, the autoclave was heated while rotating the propeller blade at 100 rpm until the temperature in the system reached 70° C. As a result, the pressure in the autoclave increased to 0.42 MPa. After the temperature in the system reached 70° C., the rotational speed of the propeller blade was increased to 500 rpm and acetone was absorbed into the coarse ground particles while stirring for 10 minutes to prepare a black pasty swollen material. Then, 405 parts of aqueous ammonia having a concentration of 0.31% preheated to 70° C. was injected under pressure over 5 minutes, thereby dispersing the swollen material into water in the form of microparticles, thus yielding a black initial aqueous dispersion having an average particle diameter of 0.8 μm. While stirring continuously, the resulting initial aqueous dispersion was immediately water-cooled to 50° C. and the rotational speed of the propeller blade was increased to 50 rpm. While heating to 90° C. over 4 hours, 20 parts of 2% dilute hydrochloric acid, 20 parts of a 1% aluminum sulfate solution and 10 parts of a 1% sodium dodecylbenzenesulfonate solution were added dropwise, thereby associating with the resin particles to prepare an aqueous dispersion of polyester resin microparticles. Using a rotary evaporator, acetone was distilled off under the conditions of a temperature of 47° C. for 60 minutes, followed by washing with deionized water three times and further dehydration condensation to prepare a black aqueous dispersion of polyester resin particles for a core having a solid content of 25%. The average particle diameter of the black aqueous dispersion of polyester resin particles for a core was 4.8 μm.

In the same manner as in Example 1, except that 70 parts of a polyester resin (I-3), 30 parts of a polyester resin (II-1), 2 parts of a charge control agent "BONTRON E-80" manufactured by Orient Chemical Industries, Ltd., and 100 parts of acetone were used in place of 45 Parts of a polyester resin (I-4), 55 parts of a polyester resin (II-1) and 100 parts of acetone and 403.5 parts of aqueous ammonia having a concentration of 0.22% was used in place of 402 parts of aqueous ammonia having a concentration of 0.123%, an aqueous dispersion of polyester resin microparticles for a core for shell layer was prepared. The particle diameter of the resulting aqueous dispersion of polyester resin microparticles for a core for shell layer was measured. As a result, the average particle diameter was 0.3 μm. The proportion of the non-volatile component in the aqueous dispersion of polyester resin microparticles for shell layer was 25%.

In an autoclave equipped with an anchor blade and a condenser, 100 parts of the aqueous dispersion of polyester resin microparticles for a core and 10 parts of acetone were charged and then stirred for 2 hours while rotating the anchor blade at 50 rpm. To the mixture, 50 parts of aqueous dispersion of polyester resin microparticles for a core for shell layer was added, followed by heating to 50° C. While heating to 90° C. over 6 hours, 20 parts of 2% dilute hydrochloric acid, 20 parts of a 1% aluminum sulfate solution and 10 parts of a 1% sodium dodecylbenzenesulfonate solution were added dropwise, thereby associating with the resin particles to prepare an aqueous dispersion of polyester resin microparticles. Using a rotary evaporator, acetone was distilled off under the conditions of a temperature of 47° C. for 30 minutes, followed by washing with deionized water three times and further dehydration condensation to prepare polyester resin particles. The resulting polyester resin particles were mixed with Aerosil R-974 (silica, manufactured by Japan Aerosil Inc.) in the amount of 0.3% based on the weight of the resin particles in a Henschel mixer to prepare a toner comprising core-shell structure particles having an average particle diameter of 5.9 μm. The amount of the residual acetone of the resulting toner was measured by gas chromatography. As a result, it was 20 ppm (detection limit) or less.

Example 9

In the same manner as in Example 1, the solubility in acetone of a polyester resin (I-5) was evaluated under the conditions that the concentration of the resin was 10%. As a result, the polyester resin (I-5) was evaluated as "Borderline Solution".

100 Parts of coarse ground particles of the polyester resin (I-5) and 100 parts of acetone were charged in a 2 L autoclave equipped with a propeller blade and, after preliminarily pressurizing to 0.2 MPa using a nitrogen gas, the autoclave was heated while rotating the propeller blade at 100 rpm until the temperature in the system reached 90° C. As a result, the pressure in the autoclave increased to 0.45 MPa. After the temperature in the system reached 90° C., the rotational speed of the propeller blade was increased to 500 rpm and acetone was absorbed into the coarse ground particles while stirring for 10 minutes to prepare a translucent pasty swollen material. After the rotational speed of the propeller blade was increased to 1000 rpm, deionized water preheated to 90° C. was injected under pressure over 5 minutes to prepare a white turbid initial aqueous dispersion in which the swollen material is dispersed into water in the form of microparticles. While stirring continuously, the resulting initial aqueous dispersion was immediately water-cooled to 30° C. and taken out, and then acetone was distilled off under the conditions of a temperature of 47° C. for 30 minutes using a rotary evaporator to prepare an aqueous dispersion of polyester resin microparticles. The particle diameter of the resin in the resulting aqueous dispersion of polyester resin microparticles was measured. As a result, the average particle diameter was 0.02 μm. The amount of the residual acetone was measured by gas chromatography. As a result, it was 25 ppm. The proportion of the non-volatile component in the resulting aqueous dispersion of polyester resin microparticles was measured. As a result, it was 25%.

Example 10

In the same manner as in Example 1, except that isopropyl alcohol was used in place of acetone, the solubility of a polyester resin (I-4) and that of a polyester resin (II-1) were judged. As a result, both of them were evaluated as "Insoluble".

45 Parts of coarse ground particles of the polyester resin (I-4), 55 parts of coarse ground particles of the polyester resin (II-1) and 100 parts of isopropyl alcohol were charged in a 2 L autoclave equipped with a propeller blade and, after preliminarily pressurizing to 0.2 MPa using a nitrogen gas, the autoclave was heated while rotating the propeller blade at 100 rpm until the temperature in the system reached 90° C. As a result, the pressure in the autoclave increased to 0.42 MPa. After the temperature in the system reached 90° C., the rotational speed of the propeller blade was increased to 500 rpm and acetone was absorbed into the coarse ground particles while stirring for 10 minutes to prepare a translucent pasty swollen material. After the rotational speed of the propeller blade was increased to 1000 rpm, 402 parts of aqueous ammonia having a concentration of 0.123% preheated to 90° C. was injected under pressure over 5 minutes to prepare a white turbid initial aqueous dispersion in which the swollen material is dispersed into water in the form of microparticles. While stirring continuously, the resulting initial aqueous dispersion was immediately water-cooled to 30° C. and taken out, and then isopropyl alcohol was distilled off under the conditions of a temperature of 47° C. for 30 minutes using a rotary evaporator to prepare an aqueous dispersion of polyester resin microparticles. The particle diameter of the resin in the resulting aqueous dispersion of polyester resin microparticles was measured. As a result, the average particle diameter was 0.12 μm. The amount of the residual isopropyl alcohol was measured by gas chromatography. As a result, it was 50 ppm. The proportion of the non-volatile component in the resulting aqueous dispersion of polyester resin microparticles was measured. As a result, it was 25%.

Comparative Example 1

In the same manner as in Example 1, except that the concentration of the resin was changed to 15% from 10% and tetrahydrofuran was used in place of acetone, the solubility of a polyester resin (I-4) and that of a polyester resin (II-1) were judged. As a result, both of them were evaluated as "Complete Solution".

45 Parts of coarse ground particles of the polyester resin (I-4), 55 parts of coarse ground particles of the polyester resin (II-1) and 100 parts of tetrahydrofuran (THF) were charged in a 2 L autoclave equipped with a propeller blade and the autoclave was heated while rotating the propeller blade at 100 rpm until the temperature in the system reached 90° C. After the rotational speed of the propeller blade was increased to 1000 rpm, 402 parts of aqueous ammonia having a concentration of 0.123% preheated to 90° C. was injected under pressure over 5 minutes to prepare a white turbid initial aqueous dispersion in which the swollen material is dispersed into water in the form of microparticles. While stirring continuously, the resulting initial aqueous dispersion was immediately water-cooled to 30° C. and taken out, and then THF was distilled off under the conditions of a temperature of 47° C. for 30 minutes using a rotary evaporator to prepare an aqueous dispersion of polyester resin microparticles. The particle diameter of the resin in the resulting aqueous dispersion of polyester resin microparticles was measured. As a result, the average particle diameter was 0.18 μm. The amount of the residual THF was measured by gas chromatography. As a result, it was large such as 880 ppm. The proportion of the non-volatile component in the resulting aqueous dispersion of polyester resin microparticles was measured. As a result, it was 25%.

Comparative Example 2

In the same manner as in Example 1, except that tetrahydrofuran was used in place of acetone, the solubility of a polyester resin (I-2) and that of a polyester resin (II-2) were judged. As a result, both of them were evaluated as "Complete Solution".

36 Parts of the polyester resin (I-2), 54 parts of the polyester resin (II-2), 7 parts of carbon black MA-11 (manufactured by Mitsubishi Chemical Co.), 1.5 parts of BONTRON E-81 (charge control agent, manufactured by Orient Chemical Industries, Ltd.) and 3.5 parts of Biscoal 550P (polypropylene wax, manufactured by Sanyo Chemical Industries, Ltd.) were mixed by using a Henschel mixer and then melt-kneaded by using a pressure kneader to prepare a kneaded mixture. 100 Parts of coarse ground particles of the kneaded mixture and 30 parts of THF were charged in a 2 L autoclave equipped with a propeller blade. The autoclave was heated while rotating the propeller blade at 100 rpm until the temperature in the system reached 90° C. After the temperature in the system reached 90° C., the rotational speed of the propeller blade was increased to 500 rpm and 401.5 parts of aqueous ammonia having a concentration of 0.094% preheated to 90° C. was injected under pressure over 5 minutes to prepare a black initial aqueous dispersion in which the swollen material is dispersed into water in the form of microparticles. While stirring continuously, the resulting initial aqueous dispersion was immediately water-cooled to 30° C. and taken out and THF was distilled off at 47° C. over 60 minutes using a rotary evaporator, followed by washing once with deionized water, dehydration and further drying to prepare polyester resin particles. The resulting polyester resin particles were mixed with Aerosil R-974 (silica, manufactured by Japan Aerosil Inc.) in the amount of 0.3% based on the weight of the resin particles in a Henschel mixer to prepare particles (toner) having an average particle diameter of 6.2 μm. The amount of the residual THF of the resulting toner was measured by gas chromatography. As a result, it was 600 ppm and the resulting toner emitted an odor.

What is claimed is:

1. A method for producing an aqueous dispersion of thermoplastic resin microparticles, which comprises:
   the first step of swelling a self-water-dispersible thermoplastic resin (P) using an organic solvent (S) having a boiling point lower than 100° C., which does not dissolve but can swell the self-water-dispersible thermoplastic resin (P), to produce a swollen material;
   the second step of dispersing the swollen material into an aqueous medium in the form of microparticles to produce an initial aqueous dispersion; and
   the third step of removing the organic solvent (S) from the initial aqueous dispersion to produce a dispersion in which microparticles of the self-water-dispersible thermoplastic resin (P) are dispersed into the aqueous medium.

2. The method for producing an aqueous dispersion of thermoplastic resin microparticles according to claim 1, wherein the self-water-dispersible thermoplastic resin (P) and the organic solvent (S) are heated to produce the swollen material.

3. The method for producing an aqueous dispersion of thermoplastic resin microparticles according to claim 1, wherein the self-water-dispersible thermoplastic resin (P) and the organic solvent (S) are heated to the temperature equal to or higher than a boiling point of the organic solvent (S) to produce the swollen material in the first step and the swollen material is dispersed into the aqueous medium in the form of microparticles at the temperature equal to or higher than the boiling point of the organic solvent (S) and lower than 120° C. under pressure by means of a mechanical shear force to produce the initial aqueous dispersion in the second step.

4. The method for producing an aqueous dispersion of thermoplastic resin microparticles according to claim 3, wherein the swollen material is produced at the temperature which is 10 to 50° C. higher than a glass transition temperature (Tg) of the self-water-dispersible thermoplastic resin (P) in the first step and the initial aqueous dispersion is produced at the temperature which is 10 to 50° C. higher than the glass transition temperature (Tg) of the self-water-dispersible thermoplastic resin (P) in the second step.

5. The method for producing an aqueous dispersion of thermoplastic resin microparticles according to claim 3, wherein the organic solvent (S) is an organic solvent compatible with water.

6. The method for producing an aqueous dispersion of thermoplastic resin microparticles according to claim 3, wherein the organic solvent (S) comprises acetone and/or isopropyl alcohol.

7. The method for producing an aqueous dispersion of thermoplastic resin microparticles according to claim 3, wherein the amount of the organic solvent (S) is within a range from 10 to 200 parts by weight based on 100 parts by weight of the self-water-dispersible thermoplastic resin (P) and the amount of water is within a range from 70 to 400 parts by weight based on 100 parts by weight of the total of the self-water-dispersible thermoplastic resin (P) and the organic solvent (S).

8. The method for producing an aqueous dispersion of thermoplastic resin microparticles according to claim 1, wherein the self-water-dispersible thermoplastic resin (P) is a polyester resin.

9. The method for producing an aqueous dispersion of thermoplastic resin microparticles according to claim 1, wherein the self-water-dispersible thermoplastic resin (P) is a carboxyl group-containing polyester resin and the aqueous medium is water containing a basic compound.

10. The method for producing an aqueous dispersion of thermoplastic resin microparticles according to claim 9, wherein the carboxyl group-containing polyester resin is a resin obtained by mixing a polyester resin (I) having a gel fraction of 0.3% by weight or less, a weight-average molecular weight (Mw) as measured by a GPC (gel permeation chromatography) method of 3,000 to 20,000, a number-average molecular weight (Mn) of 1,000 to 5,000, a ratio (Mw/Mn) of 2 to 10, a ½ descendent temperature ($T_{1/2}$) as measured by a flow tester of 80 to 140° C. and an acid value of 1 to 100 with a polyester resin (II) having a gel fraction of 2% by weight or less, a weight-average molecular weight (Mw) as measured by a GPC (gel permeation chromatography) method of 200,000 to 2,000,000, a number-average molecular weight (Mn) of 5,000 to 20,000, a ratio (Mw/Mn) of 10 to 400, a ½ descendent temperature ($T_{1/2}$) as measured by a flow tester of 150 to 250° C. and an acid value of 1 to 100.

11. The method for producing an aqueous dispersion of thermoplastic resin microparticles according to claim 1, wherein the self-water-dispersible thermoplastic resin (P) is used in combination with a colorant (C) to producing a dispersion in which microparticles of the self-water-dispersible thermoplastic resin (P) colored with the colorant (C) are dispersed into the aqueous medium.

12. The method for producing an aqueous dispersion of thermoplastic resin microparticles according to claim 1, wherein the self-water-dispersible thermoplastic resin (P) and the organic solvent (S) are used in a combination such that, when 15 parts by weight of the self-water-dispersible thermoplastic resin (P) in the form of particles and 85 parts by weight of the organic solvent (s) are charged in a flask and sealing and shaking at 25° C. for 16 hours are conducted, evaluation results conducted according to the criteria described in 7.2.1.1 to 7.2.1.3 of ASTM D3132-84 show a "Borderline Solution" or "Insoluble" based on the ASTM criteria.

13. The method for producing an aqueous dispersion of thermoplastic resin microparticles according to claim 1, wherein the self-water-dispersible thermoplastic resin (P) and the organic solvent (S) are used in a combination such that, when 10 parts by weight of the self-water-dispersible thermoplastic resin (P) in the form of particles and 90 parts by weight of the organic solvent (s) are charged in a flask and sealing and shaking at 25° C. for 16 hours are conducted, evaluation results conducted according to the criteria described in 7.2.1.1 to 7.2.1.3 of ASTM D3132-84 show a "Borderline Solution" or "Insoluble" based on the ASTM criteria.

14. The method for producing an aqueous dispersion of thermoplastic resin microparticles according to claim 3, wherein the self-water-dispersible thermoplastic resin (P) is a polyester resin.

15. The method for producing an aqueous dispersion of thermoplastic resin microparticles according to claim 3, wherein the self-water-dispersible thermoplastic resin (P) is a carboxyl group-containing polyester resin and the aqueous medium is water containing a basic compound.

16. The method for producing an aqueous dispersion of thermoplastic resin microparticles according to claim 3, wherein the self-water-dispersible thermoplastic resin (P) is used in combination with a colorant (C) to producing a dispersion in which microparticles of the self-water-dispersible thermoplastic resin (P) colored with the colorant (C) are dispersed into the aqueous medium.

17. The method for producing an aqueous dispersion of thermoplastic resin microparticles according to claim 3, wherein the self-water-dispersible thermoplastic resin (P) and the organic solvent (S) are used in a combination such that, when 15 parts by weight of the self-water-dispersible thermoplastic resin (P) in the form of particles and 85 parts by weight of the organic solvent (s) are charged in a flask and sealing and shaking at 25° C. for 16 hours are conducted, evaluation results conducted according to the criteria described in 7.2.1.1 to 7.2.1.3 of ASTM D3132-84 show a "Borderline Solution" or "Insoluble" based on the ASTM criteria.

18. The method for producing an aqueous dispersion of thermoplastic resin microparticles according to claim 3, wherein the self-water-dispersible thermoplastic resin (P) and the organic solvent (S) are used in a combination such that, when 10 parts by weight of the self-water-dispersible thermoplastic resin (P) in the form of particles and 90 parts by weight of the organic solvent (s) are charged in a flask and sealing and shaking at 25° C. for 16 hours are conducted, evaluation results conducted according to the criteria described in 7.2.1.1 to 7.2.1.3 of ASTM D3132-84 show a "Borderline Solution" or "Insoluble" based on the ASTM criteria.

* * * * *